Feb. 24, 1970 E. E. JUNGCLAS, JR 3,497,712

VARIABLE FREQUENCY PATTERN GENERATOR

Filed Dec. 2, 1963 2 Sheets-Sheet 1

INVENTOR.
ELMER E. JUNGCLAS JR.,
Walter J. Adam
ATTORNEY.

Feb. 24, 1970 E. E. JUNGCLAS, JR 3,497,712

VARIABLE FREQUENCY PATTERN GENERATOR

Filed Dec. 2, 1963 2 Sheets-Sheet 2

INVENTOR.
ELMER E. JUNGCLAS JR.,

BY

Walter J. Adam

ATTORNEY.

3,497,712
VARIABLE FREQUENCY PATTERN GENERATOR
Elmer E. Jungclas, Jr., Bethesda, Md., assignor to Hughes Aircraft Company, Culver City, Calif., a corporation of Delaware
Filed Dec. 2, 1963, Ser. No. 327,455
Int. Cl. H03k 3/45
U.S. Cl. 307—88 5 Claims

ABSTRACT OF THE DISCLOSURE

A pulse generator which propagates a magnetic domain wall along a magnetic wire at a desired velocity in response to a selected magnetic progagated field. A coil wound around the wire responds to an adjustable DC current to develop the propagating field with magnetomotive force for providing the desired propogation velocity of the domain wall. Sensing conductors positioned along the wire develop a sequence of pulses. A recording arrangement is provided to periodically establish domain walls in the magnetic medium.

This invention relates to pulse generating circuits and particularly to an improved variable rate pulse pattern generator.

Pulse pattern generators which generate serial digital patterns of a predetermined sequence of high and low level signals or binary "ones" and "zeros," have many uses such as for forming pulses in coded recognition systems and for testing or controlling digital equipment. In many uses, it may be desirable to vary not only a repetitive pattern of pulses but to vary the rate of forming the pulses of the pattern, that is, to vary the time required to form a predetermined sequence of high and low level signals. Such pulse patterns are conventionally formed by magnetostrictive delay line pattern generators or by flip flop logical counter and gate arrangements. The delay line generator has a fixed delay so that the time between output pulses of any selected pattern may only be varied by adjusting the positions of the pickup heads. Flip flop counter and gate arrangements are relatively complicated and expensive to build and the rate of generating any fixed pattern can normally only be varied by varying a source of timing pulses. Also in the flip flop counter arrangement, relatively complicated gates are required in order to develop selectable patterns of pulses.

It is therefore an object of this invention to provide a simplified low cost and reliable pulse pattern generator.

It is a further object of this invention to provide a pulse pattern generator in which different pulse patterns may be selected with a minimum amount of control circuits.

It is still a further object of this invention to provide a pulse pattern generator that allows variation of the frequency of generating selected pulse patterns by a simplified and reliable control scheme.

It is another object of this invention to provide a simplified and reliable variable frequency pulse pattern generator in which the frequency of generating a pattern is varied by a simple adjustment of a current magnitude.

In accordance with the principles of this invention a variable frequency pulse pattern generator is provided in which a magnetic domain wall is propagated down a magnetic medium in response to a magnetic propagating field having a selectively variable magnetomotive force, with sensing conductors positioned along the medium developing a desired pattern or sequence of pulses. A recording arrangement is provided to periodically establish the magnetic domain wall and a propagating coil responds to a selected DC (direct current) current to propagate the domain wall at a selected rate along the medium. The sensing conductors are selectively connectable to an output arrangement to provide a desired pattern or time relation of pulses. The rate at which the domain is propagated and the frequency of forming the pulses of a selected pattern is proportional to the magnitude of the propagating field which in turn is a function of the amplitude of the DC current applied to the propagating coil.

The novel features of this invention, as well as the invention itself, both as to its organization and method of operation, will best be understood from the accompanying description, taken in connection with the accompanying drawings in which.

Figure 1:
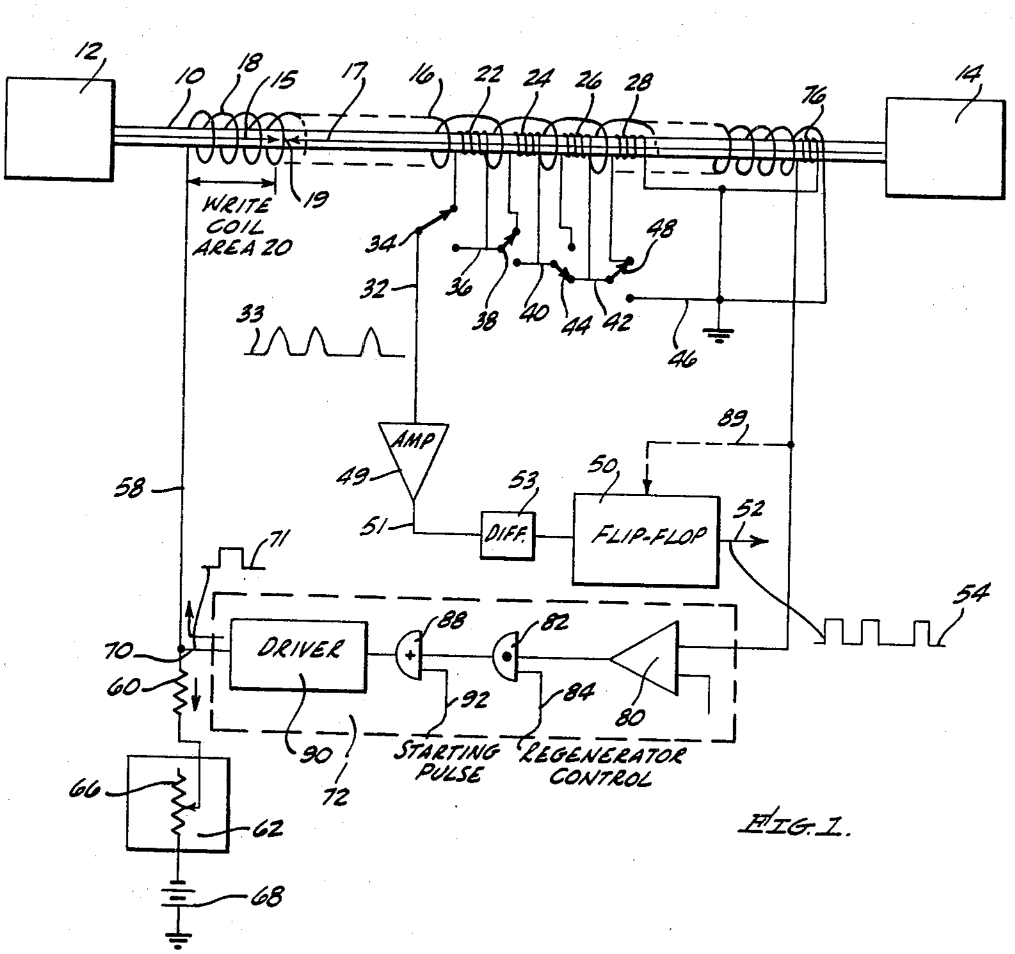
FIGURE 1 is a schematic circuit and block diagram showing the variable frequency pattern generator including a magnetic wire in accordance with the principles of the invention.

Referring first to FIG. 1, the pattern generator in accordance with the invention includes a magnetic medium 10 which may be a wire of a suitable ferromagnetic material such as a composition of iron-nickel. The magnetic wire 10 may be magnetically oriented along the longitudinal axis thereof, that is, with the magnetic dipoles or elements having a preferred direction of magnetic alignment substantially parallel to the longitudinal axis. The magnetic orientation may be provided, for example, by maintaining the wire 10 under a stress condition such as axial tension, torsion, or axial compression. The stress may, in some arrangements, be substantially near the yield point of the material but it is to be recognized that the principles of the invention are not to be limited to any particular stress condition. For some magnetic material such as thin films, longitudinal orientation for operation of the system in accordance with the invention may be provided without this stress condition so that the principles of the invention are applicable to any magnetic material sufficiently oriented to provide satisfactory operation. An oriented magnetic medium has the property that substantially more magnetomotive force must be applied thereto to establish a magnetic domain in the direction of orientation than is required to propagate or move a domain wall in the direction of orientation, the domain wall being at the junction of two opposite magnetic poles of established magnetic domains. The wire 10 may be provided with a desired axial tension by suitable maintaining structures 12 and 14.

To provide a magnetic propagating field parallel to the longitudinal axis of the wire 10, a propagating structure such as a helical coil 16 is wound or positioned around the wire 10 along the length thereof. In order to establish magnetic domains at the end of the wire 10, the coil 16 is wound with a relatively short pitch, that is, more turns per unit length of the wire 10 at a first end thereof than along the remaining portion, as shown by a coil portion 18. As will be explained subsequently the coil portion 18 functions as a write coil to continuously establish a magnetic domain of an arrow 15 in a write coil area 20 as a domain wall is propagated along the length of the wire 10, the wire being previously magnetized to the state of an arrow 17 so that a domain wall 19 is formed at the junction of the domains of the arrows 15 and 17. It is to be noted that continuous propagating structures may be utilized in accordance with the principles of the invention other than the coil 16 such as pairs of continuous segments positioned orthogonal to the wire 10 with alternate adjacent pairs positioned on opposite sides of the wire 10. For sensing the domain walls propagated thereby during pulse forming operations, pickup or sense coils 22, 24, 26 and 28 are suitably positioned around the wire 10 preferably within the helical coil 16. It is to be noted that any suitable sensing coil or conductor may be utilized in accordance with the principles of the invention.

Because each of the pickup coils serially applies a sensed signal to a lead 32, a desired pulse pattern may be developed by a switching arrangement to selectively connect and disconnect the pickup coils therefrom. A switch 34 connects the lead 32 either through the coil 22 or to a lead 36 which in turn is coupled to a switch 38 that may selectively connect a path through the coil 24 to a lead 40 or directly to the lead 40. In a similar manner the lead 40 is selectively connectable to a lead 42 either through the coil 26 or directly thereto through a switch 44 and the lead 42 is selectively connectable through the coil 28 or to a lead 46 through a switch 48. The lead 46 may be coupled to a suitable source of reference potential such as ground. The pulse pattern of a waveform 33 sensed on the lead 32 may be applied through an amplifier 49 and a lead 51 to a flip flop 52 and to an output lead 52 as a pulse pattern having relatively square pulses of a waveform 54. In one arrangement in accordance with the invention, a differentiating circuit 53 may be included in the lead 51 so that the flip flop 50 is triggered alternately to a first or high state and a second or low state in response to the leading and trailing edges of each pulse of the waveform 54. If it is desired that the pulse pattern of the waveform 52 only changes level at each pulse of the waveform 33, the flip flop 50 can be arranged to respond to each pulse without the differentiating circuit 53. However, with this latter arrangement, the flip flop 50 may be required to reset at the end of each pattern when the selected pattern has an odd number of pulses therein. Another arrangement that may be utilized to shape the pulses of the waveform 34 is to utilize a monostable multivibrator for the flip flop 50 coupled directly to the amplifier 49. Also, it is to be recognized that if the amplifier 49 is a high gain saturating type, the pulses of the waveform 33 will be shaped at the lead 51 without requiring further circuitry. Because the widths of the pulses of the waveform 33 also change with the domain wall propagating speed, the arrangement utilizing a monostable multivibrator coupled to the lead 51 may be advantageous when pulses of equal width are desired over a wide range of pulse repetition frequency.

For propagating the domain wall 19 between the arrows 15 and 17 along the wire 10, the conducting coil 16 may be coupled from a suitable source of reference potential such as ground to a lead 58 and through a resistor 60 to a controllable source of DC current 62. Because the magnitude of the propagating field is substantially directly proportional to the current passing through the coil 16, the DC source 62 may include any suitable current control arrangement such as a potentiometer indicated by an arm 64 coupled between the resistor 60 and a resistor 66 having one end coupled to a suitable source of negative potential such as a −10 volt terminal of a battery 68 having a positive terminal coupled to ground. It is to be noted that although a DC current is illustrated for controlling the magnitude of the propagating fields, the current source may include other arrangements such as a source of periodic current pulses which are applied to the coil 16, in accordance with the principles of the invention, with the speed of propagation being varied by adjusting the amplitudes of the pulses. In this arrangement the magnetic domain wall may be periodically interrupted in transit along the wire 10.

To periodically establish a magnetic domain of the arrow 17 along the entire length of the wire 10 a relatively large current is applied to the lead 58 through a lead 70 in response to a trigger pulse circuit 72 which may be either selectively or automatically energized. To provide a continuously operating pulse generator, the trigger pulse circuit 72 may respond to a pickup or sensing coil 76 wound around the wire 10 substantially at the end thereof and having one end coupled to a suitable source of reference potential such as ground. The other end of the pickup coil 76 may be coupled through a lead 78 to an amplifier 80 and in turn to an "and" gate 82. A lead 84 applies a regenerator control signal to the "and" gate 82 to allow a continuous pattern to be formed in response to signals sensed by the coil 76. The output of the "and" gate 82 is coupled to an "or" gate 88 which in turn is coupled through a suitable driver circuit 90 which applies the current pulse of a waveform 71 to the lead 70. For initially starting the operation during a continuous mode or for starting the operation during a selection mode, by passing a relatively large current pulse through the coil 16, a trigger or starting pulse may be applied from a lead 92 to the "or" gate 88. It is to be noted that a dotted lead 89 may be provided between the lead 78 and the flip flop 70 to apply a reset pulse thereto if an arrangement is utilized without the differentiating circuit 53 and it is desired that the pulse pattern of the waveform 54 change levels at each pulse of the waveform 33. Under these conditions, the reset pulse may be required when forming pulse patterns having odd number of pulses or alternate patterns will be inverted.

Figure 2:
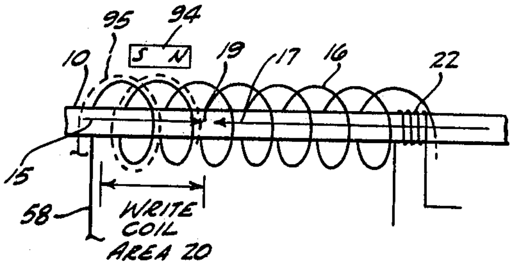
FIG. 2 is a schematic circuit diagram showing a second arrangement that may be utilized to form the pattern generator of FIG. 1.

Referring now to FIG. 2, another arrangement is shown in accordance with the invention for recording the magnetic domain of the arrow 15 rather than varying the pitch of winding of the coil 16 to form the coil section 18. A suitable magnetic device such as a magnet 94 may be positioned at the write coil area 20, the magnetic device of the proper polarity and substantially adjacent to the wire 10. The magnet device 94 may be either a permanent magnet or a magnetic coil energized by a DC source, for example. Also, in accordance with the principles of the invention, a separate coil or structure such as the dotted coil 95 may be utilized in combination with the coil 16 with one coil utilized for applying the constant propagating field which may be formed from DC current and the other coil utilized for initiating the operation in response to the pulse of the waveform 71. This arrangement utilizing separate coils may be desirable in some applications for simplifying the pulse forming operation of the trigger source 72 by providing electrical isolation therebetween.

Figure 3:
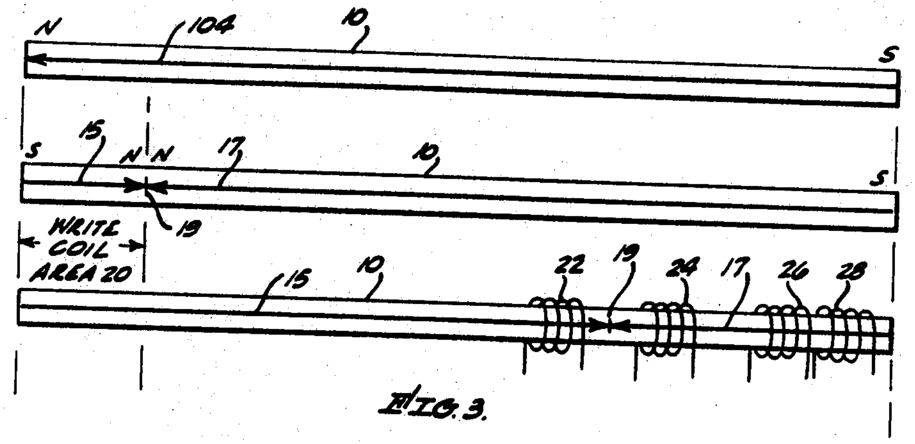
FIG. 3 is a schematic diagram showing the magnetic states of the magnetic wire utilized in FIG. 1 for further explaining the operation thereof.
Figure 4:
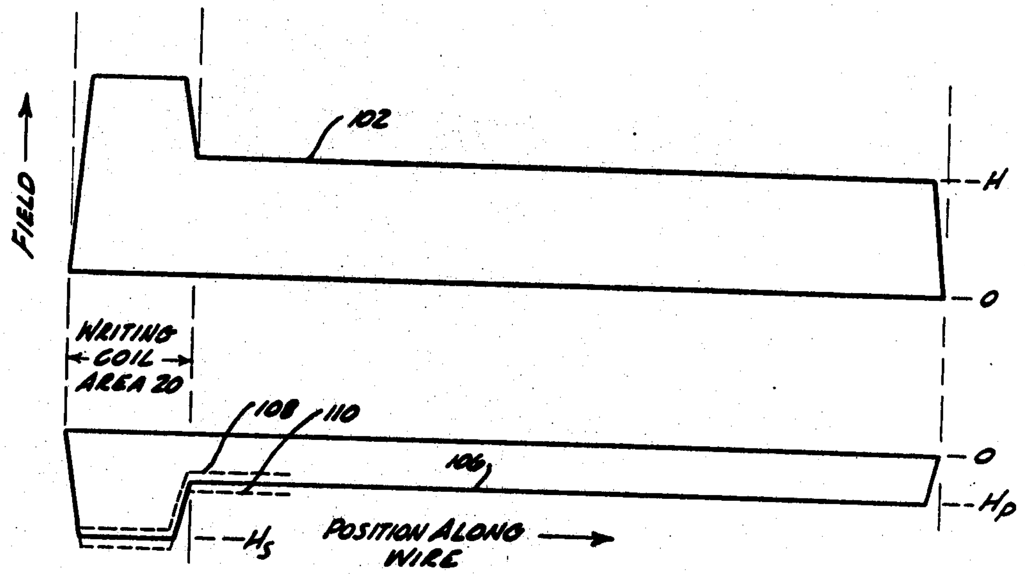
FIG. 4 is a schematic diagram of magnetic field intensity or magnetomotive force versus distance along the magnetic wire of FIG. 1 for further explaining the operation thereof.

Referring now to FIGS. 3 and 4 as well as to FIG. 1, the system will be explained in further detail relative to the sequence of operation. To initiate an output digital pattern of the waveform 54, the trigger pulse of the waveform 71 is applied from the trigger pulse circuit 72 in a direction opposite from the continuously flowing DC current applied by the source 62. As shown by a waveform 102 of FIG. 4, the trigger pulse develops a field of an amplitude H to establish a constant domain of an arrow 104 along the wire 10. The trigger current of the waveform 71 must have sufficient amplitude to guarantee that the wire 10 is magnetized in the direction of the arrow 104. Thus, the magnetic field of the waveform 102 must be of sufficient magnetomotive force along the wire 10 outside of the write coil area 20 so that complete magnetic switching is provided to the polarity shown. After the termination of the trigger pulse of the waveform 71 the DC current reestablished by the source 62 produces a magnetic field of a waveform 106 in the coil 16 which is in the opposite direction or polarity from the field of the waveform 102. The magnetic field of the waveform 106 within the write coil area 20 must be of sufficient magnitude H*s* to establish the magnetic domain 15 while outside of the coil area 20 the field magnitude H*p* must be sufficiently small so that magnetic nucleation or formation of an opposite domain is not provided and the domain of the arrow 17 remains of the same polarity as that of the arrow 104.

An oriented magnetic medium requires a substantially larger magnetomotive force for establishing a magnetic domain, that is, for nucleation or reversing the magnetic direction of the magnetic elements or dipoles of the material than is required to propagate a magnetic domain wall in the direction of orientation, once established. Although on a low frequency loop tracer apparatus the hysteresis loop appears to have a substantially rectangular configuration, the hysteresis loop during operation essentially has an I-shape, that is, substantially wide in the magnetomotive force direction at the positive and negative saturation flux density positions of the curve while being substantially narrow in the regions of less positive and negative flux density. Thus the operation of the system of the invention utilizes the principle that substantially less magnetomotive force is required to propagate a domain wall, that is the magnetic region between two opposite magnetic states along a magnetic medium, than is required to establish or nucleate a magnetic domain wall.

As the magnetic domain 15 having the wall 19 between the domains 15 and 17 is formed and propagated upon restoration of the DC current from the source 62, the wall 19 moves to the right of the wire 10 at a velocity determined by the magnitude of the propagating field of the waveform 106. The rate at which the domain wall 19 propagates or the velocity of propagation is directly proportional to the magnitude of the propagating field Hp of the waveform 106 applied thereto, which field is substantially directly proportional to the magnitude of the DC propagating current. For example, if the propagating field has a magnitude level of a dotted waveform 108, the domain wall moves at a proportionally lower velocity than if the magnitude of the propagating field is greater as indicated by a dotted waveform 110. When the domain wall 19 moves at a high velocity, the time between pulses or the absence of pulses of the waveform 33 decreases and when the domain wall 19 moves at a low velocity, the time between pulses or the absence of pulses of the waveform 33 increases It is to be noted that the adjustment of the DC current may be made over a wide range by having the coil section 18 of a sufficient turns ratio so that a nucleating field is always provided in the coil area 20. In the arrangement of FIG. 2 in which a separate arrangement establishes the domain 15, even a wider range of adjustment may be provided.

When the domain wall 19 passes under the coil 22 as shown in FIG. 3, a pulse of the waveform 33 is applied to the lead 32. Similar voltage pulses are induced in the coils 26, 24 and 28 as the domain wall 19 passes positions adjacent thereto. Depending upon the positions of the pickup coils a desired pulse pattern may be developed. Also by controlling the switches 34, 38, 44 and 48 a pattern may be selected during operation. The switches such as 34 may either be manually controlled switches or electronic switches that may, in some arrangements, be remotely controlled as are well known in the art. In the positions of the switches as shown, the pickup coil 26 is bypassed so that the digital pattern of the waveform 32 may be considered a 1 1 0 1. In response to the voltage pulses of the waveform 33, the flip flop 50 is triggered to form a pulse pattern of substantially square pulses of the waveform 54. As discussed previously, other arrangements may be utilized to shape the pulses of the waveform 54. The pickup coils such as 22 and 24 are spaced sufficiently apart to provide signal resolution and may be of a selected width and density of turns per unit length of the wire 10. By selecting the width of the coils such as 22 and 24 the width of the voltage signals such as shown by the waveform 33 are substantially of selected terminations which may be advantageous when the flip flop 50 is triggered and reset in response to the differentiating circuit 53 or when the pulses are shaped by a saturtaing amplifier arrangement. It is to be noted that although the widths of the pulses vary with the speed of propagation of the domain wall, the pulse widths may be maintained constant by properly processing the pulses of the waveform 33, as previously discussed. Also if the pulse widths are small relative to the time between pulses, the change in pulse widths is relatively small. A variation of the pulse widths in proportion to the pulse frequency may be desirable for some pulse patterns such as when the output pulses on the lead 52 change levels in response to each pulse of the waveform 33.

In order that the pulse generator is "free running" or functions to develop continuous pulse patterns of the waveform 54, the coil 76 responds to the domain wall 19 passing adjacent thereto to apply a voltage pulse through the "and" gate 82 and the "or" gate 88 to again form the trigger pulse of the waveform 71 and establish the first magnetic state of the arrow 104. It is to be noted that the pickup coil 76 may be selected of a sufficient width to establish the magnetic state of the arrow 104 and may be positioned at any desired position to the right of the coil 28. The operation of the generator continues in a manner similar to that discussed above to provide any selected pulse pattern combination such as shown by the waveform 54, and will not be explained in further detail.

It is to be noted that although the arrangement of FIG. 1 is shown with a pulse pattern of four pulse positions, any desired number of pickup coils such as 22 may be included. Also, in accordance with this invention, a plurality of magnetic wires such as 10 and associated pickup coils may be positioned within a single propagating coil such as 16 to produce multiple patterns.

As previously discussed, the rate at which the magnetic domain wall such as 19 is propagated along the wire 10 is directly proportional to the magnitude of the propagating field applied thereto. A range of 50 microseconds per foot to 600 microseconds per foot has been produced in the system in accordance with this invention. Thus, by controlling the magnitude of the DC current supplied by the source 62, a very large range of pulse pattern repetition rates or repetition rates of pulse time positions is provided. A typical output pulse for a selected width of pickup coils when utilizing a 0.001 inch diameter 72% nickel—28% iron material for the wire 10 and number 33 copper wire for the helical coil 16 provides a pulse of the waveform 33 substantially 8 microseconds wide at the base and approximately 2 millivolts in amplitude. The propagation rate for the magnetic domain along the wire 10 when forming this pulse was approximately 420 microseconds per foot in response to a propagating field of 3 oersteds.

Thus, there has been described a pulse pattern generator that by a simple and reliable adjustment may be controlled to vary the rate of pulse generation. The propagating arrangement in accordance with this invention provides a very wide range of selectable pulse repetition frequencies. Because the generated pulses are sensed in coils or conductors, the pulse width and amplitude may be readily controlled and undesired noise or signals are not developed.

What is claimed is:

1. A pulse pattern generator comprising:

a magnetic wire having first and second ends and being magnetically oriented along the longitudinal axis thereof, a propagating coil wound around said wire with a first pitch at said first end and a second pitch along substantially the remainder of said wire, said first pitch having substantially more turns per unit length of said wire than the turns per unit length of said second pitch,
a plurality of sensing coils wound around said wire at selected positions and coupled in series,
a variable source of direct current coupled to said propagating coil for applying current therethrough in a first direction, and
a source of current pulses coupled to said propagating coil for applying current pulses therethrough in a second direction,
whereby said current pulses established said wire in a first magnetic state and said direct current establishes a magnetic domain in said wire adjacent to the portion having a first pitch and propagates said domain past said sensing coils to develop a pattern of pulses having time relations determined by said variable source of direct current.

2. A pulse pattern generator comprising:
a magnetic wire having first and second ends and a longitudinal axis, said wire being maintained under stress so as to be magnetically oriented along said axis,
a propagating coil wound around said wire,
a plurality of sensing conductors wound around said wire at selected positions and coupled in series,
a source of current pulses coupled to said propagating coil for applying current pulses therethrough in a first direction to magnetize said wire in a first state,
means positioned adjacent to the first end of said wire for establishing a magnetic domain wall thereat, and
a variable source of direct current coupled to said propagating coil for applying current therethrough in a second direction to move said domain wall to said second end,
whereby said domain wall moves past said sensing coils to develop a pattern of pulses at a rate determined by said variable source of direct current.

3. A pulse pattern generator comprising:
a magnetic wire having a longitudinal axis and first and second ends, said wire being of a material having a magnetic retentivity and being magnetically oriented along the axis thereof,
a helical coil wound around said wire with a relatively short pitch in a predetermined region at a first end and with a relatively long pitch along substantially the remainder of said wire,
a source of trigger pulses coupled to said coil to pass current in a first direction to magnetize said wire in a first magnetic state along said axis,
a selectively variable source of DC current coupled to said coil for passing current therethrough in a second direction to establish a magnetic domain of a second magnetic state in said predetermined region with a domain wall thereat and to apply a propagating field along the remainder of said wire, said propagating field having a magnetomotive force of sufficient magnitude to move said domain wall to said second end at a velocity determined by said variable source of DC current but of insufficient magnitude to magnetize said wire in said second state,
a plurality of sense conductors coupled to said wire for responding to said magnetic domain propagated thereby to develop a pulse pattern, and
a trigger conductor coupled to said wire at said second end and to said source of trigger pulses to energize said source of trigger pulses for respectively forming said pulse patterns.

4. A pulse pattern generator comprising:
a wire having a longitudinal axis and first and second ends, said wire being of a magnetic material having a magnetic orientation along said axis,
means coupled to said wire for applying a magnetic field to establish a first domain along said wire of a first polarity,
means coupled to said wire for establishing a second magnetic domain at a first end of said wire of a second polarity with a domain wall adjacent to said first domain,
means coupled to said wire for applying a propagating field thereto of a second polarity to move said domain wall to the second end of said wire, said propagating field being of a variable magnitude, and
a plurality of sense conductors coupled to said wire for responding to said domain wall moving thereby, said conductors coupled in series to form a pulse pattern at a pulse frequency determined by the variable magnitude of said propagating field.

5. A pulse pattern generator comprising:
a wire having a longitudinal axis and first and second ends, said wire being of a magnetic material having a magnetic orientation along said axis,
first means coupled to said wire for applying a magnetic field to establish a first domain in said wire of a first polarity,
second means coupled to said wire for establishing a second magnetic domain at a first end of said wire of a second polarity with a domain wall adjacent to said first domain,
third means coupled to said wire for applying a propagating field thereto of a second polarity to move said domain wall to the second end of said wire, said propagating field being of a variable magnitude,
a plurality of sense conductors coupled to said wire for responding to said domain wall moving thereby, said conductors coupled in series to form a pulse rate determined by the variable magnitude of said propagating field, and
a trigger conductor coupled to said wire substantially at the second end thereof and to said second means for forming repetitive pulse patterns.

References Cited

UNITED STATES PATENTS

| | | | |
|---|---|---|---|
| 3,090,946 | 5/1963 | Bobeck | 340—174 |
| 2,914,757 | 11/1959 | Millership | 340—347 |
| 2,919,432 | 12/1959 | Broadbent | 340—174 |
| 3,016,196 | 1/1962 | Mallery | 340—174 |
| 3,241,127 | 3/1966 | Snyder | 340—174 |
| 3,248,716 | 4/1966 | Snyder | 340—174 |

BERNARD KONICK, Primary Examiner

G. M. HOFFMAN, Assistant Examiner

U.S. Cl. X.R.

328—55, 66; 340—174